United States Patent [19]

Freeman

[11] Patent Number: 5,256,705
[45] Date of Patent: Oct. 26, 1993

[54] COMPOSITION WITH TACKIFIER FOR PROTECTING COMMUNICATION WIRES

[75] Inventor: Clarence S. Freeman, Channelview, Tex.

[73] Assignee: WaterGuard Industries, Inc., Houston, Tex.

[21] Appl. No.: 401,563

[22] Filed: Aug. 28, 1989

Related U.S. Application Data

[63] Continuation of Ser. No. 181,833, Apr. 15, 1988, abandoned, which is a continuation-in-part of Ser. No. 45,889, May 1, 1987, abandoned, which is a continuation-in-part of Ser. No. 939,007, Dec. 8, 1986, Pat. No. 4,752,997, which is a continuation-in-part of Ser. No. 844,144, Mar. 26, 1986, Pat. No. 4,711,022.

[51] Int. Cl.$^5$ .............................................. H02G 15/00
[52] U.S. Cl. ................................ 523/173; 174/23 C; 524/311; 524/474; 524/476; 524/531; 524/556
[58] Field of Search ................. 523/173; 524/311, 474, 524/476, 531, 556

[56] References Cited

U.S. PATENT DOCUMENTS

| | | | |
|---|---|---|---|
| H624 | 2/1987 | Handling, Jr. et al. | 428/462 |
| Re. 30,715 | 8/1981 | Woytiuk | 174/23 C |
| Re. 32,649 | 4/1988 | Brandt et al. | 604/368 |
| 3,347,974 | 10/1967 | Arendt et al. | 174/23 |
| 3,403,089 | 9/1968 | Joyce | 204/181 |
| 3,445,362 | 5/1969 | Chow et al. | 204/181 |
| 3,538,235 | 11/1970 | Arendt et al. | 174/23 |
| 3,589,364 | 6/1971 | Dean et al. | 128/284 |
| 3,661,358 | 5/1972 | Dill | 254/134.3 |
| 3,661,815 | 5/1972 | Smith | 260/17.4 |
| 3,880,752 | 4/1975 | Premo | 210/54 |
| 3,893,962 | 7/1975 | Walton et al. | 260/28.5 A |
| 3,990,872 | 11/1976 | Cullen | 55/274 |
| 3,996,413 | 12/1976 | Foord et al. | 174/23 C |
| 4,002,819 | 1/1977 | Woytiuk | 174/23 C |
| 4,004,077 | 1/1977 | Woytiuk | 174/23 C |
| 4,036,360 | 7/1977 | Deffeyes | 206/204 |
| 4,105,033 | 8/1978 | Chatterjee et al. | 128/285 |
| 4,124,116 | 11/1978 | McCabe, Jr. | 206/204 |
| 4,129,544 | 12/1978 | Craig | 260/29.3 |
| 4,144,252 | 3/1979 | Wang et al. | 526/284 |

(List continued on next page.)

FOREIGN PATENT DOCUMENTS

| | | |
|---|---|---|
| 2007163 | 9/1971 | Denmark . |
| 2250042 | 5/1974 | Denmark . |
| 00188959 | 7/1986 | European Pat. Off. . |
| 2755568 | 6/1979 | Fed. Rep. of Germany . |
| 1473753 | 3/1967 | France . |
| 7912046 | 5/1979 | France . |
| 2456375 | 5/1980 | France . |
| 2566955 | 1/1986 | France . |
| 1146613 | 3/1969 | United Kingdom . |
| 1200395 | 7/1970 | United Kingdom . |
| 1598807 | 9/1981 | United Kingdom . |
| 2080998 | 2/1982 | United Kingdom . |
| 2168991 | 7/1986 | United Kingdom . |

OTHER PUBLICATIONS

Diagnetics Technical Bulletin: Hydrolock, Diagnetics, Inc. (1984).

Watson, A. L., et al., "Fillers for Cables", Fillers '86, London Mar. 13–14, 1986, Plastics and Rubber Institute: London (1986).

*Primary Examiner*—Joseph L. Schofer
*Assistant Examiner*—R. H. Delorendo
*Attorney, Agent, or Firm*—Vaden, Eickenroht, Thompson, Boulware & Feather

[57] ABSTRACT

A composition including a gel, water absorbent hydrocarbon polymer with pendant anionic groups and a tackifier. The gel composition is activated with moisture so that the water absorbent composition migrates to engage and absorb the water. The composition is used as a protective filling around communication wires prior to wrapping and as a filling inside the cable cover containing the wires. The composition eliminates shorts caused by moisture contact with such wires.

8 Claims, No Drawings

U.S. PATENT DOCUMENTS

| | | | |
|---|---|---|---|
| 4,194,995 | 3/1980 | Schermann et al. | 260/14 |
| 4,238,638 | 12/1980 | Cretney et al. | 174/23 C |
| 4,242,206 | 12/1980 | Estabrooke | 210/489 |
| 4,254,250 | 3/1981 | Glowaky et al. | 525/350 |
| 4,295,987 | 10/1981 | Parks | 252/194 |
| 4,308,416 | 12/1981 | Herman et al. | 174/23 C |
| 4,366,075 | 12/1982 | Beach | 252/28 |
| 4,366,284 | 12/1982 | Ishido et al. | 524/447 |
| 4,388,485 | 6/1983 | Zeidler | 174/230 |
| 4,419,236 | 12/1983 | Hsu | 210/282 |
| 4,442,173 | 4/1984 | Takegami et al. | 428/372 |
| 4,443,312 | 4/1984 | Hennon | 204/181 |
| 4,446,261 | 5/1984 | Yamasaki et al. | 524/40 |
| 4,454,055 | 6/1984 | Richman et al. | 252/194 |
| 4,497,930 | 2/1985 | Yamasaki et al. | 524/556 |
| 4,505,976 | 3/1985 | Doehnert et al. | 428/355 |
| 4,566,943 | 1/1986 | Hansson et al. | 162/168.2 |
| 4,588,505 | 5/1986 | Walley et al. | 210/502.1 |
| 4,608,173 | 8/1986 | Watanabe | 55/524 |
| 4,616,063 | 10/1986 | Le-Khac | 525/91 |
| 4,618,631 | 10/1986 | Takeda et al. | 521/109.1 |
| 4,639,483 | 1/1987 | Billigmeier et al. | 523/173 |
| 4,654,039 | 3/1987 | Brandt et al. | 604/368 |
| 4,690,971 | 9/1987 | Flesher et al. | 524/555 |
| 4,711,022 | 12/1987 | Freeman et al. | 29/825 |
| 4,721,832 | 1/1988 | Toy | 174/87 |
| 4,747,960 | 5/1988 | Freeman et al. | 174/14 R |
| 4,752,997 | 6/1988 | Freeman et al. | 29/402.18 |
| 4,756,851 | 7/1988 | Billigmeier et al. | 523/173 |
| 4,849,484 | 7/1989 | Heard | 525/221 |

COMPOSITION WITH TACKIFIER FOR PROTECTING COMMUNICATION WIRES

This application is a continuation of co-pending application Ser. No. 07/181,833, filed on Apr. 15, 1988, abandoned, which is a continuation-in-part of Ser. No. 045,889, filed May 1, 1987, now abandoned, entitled COMPOSITION FOR PROTECTING COMMUNICATION WIRES which is in turn a continuation-in-part of Ser. No. 06/939,007, now U.S. Pat. No. 4,752,997 filed Dec. 8, 1986, entitled CABLE MAINTENANCE APPARATUS AND METHOD which is in turn a continuation-in-part of U.S. patent application Ser. No. 06/844,144 filed March 26, 1986 entitled METHOD FOR WIRE INSULATION which has issued as U.S. Pat. No. 4,711,022 on Dec. 8, 1987.

BACKGROUND OF THE INVENTION

1. Field of the Invention

This invention is for a gel chemical composition with a tackifier. The composition is sticky and will coat and adhere to surfaces. The composition is activated by moisture to absorb water and can be used to protect components from water damage.

The composition can be used to coat wires and the sheathes around the wires used in communication cables. The tacky gel can be used to coat the wires during cable manufacturing. The composition also heals shorts in lines such as telephone splices which carry a small dc current.

2. Description of the Prior Art

Communications cables such as telephone lines are made up of a multitude of wires, typically copper wire, which are insulated with plastic or other materials. Many wire pairs make up one cable. Typically a wire pair is surrounded by a plastic or paper sheath or wrapper. The multitude of wrapped wire pairs are enclosed in a flexible cable cover.

The wires have been coated with a thin layer of thermoplastic resin such as polyethylene. The wires are drawn through a vessel of heated thermoplastic and as the wire goes through the heated resin a thin coating is deposited and adheres while cooling onto the wire. This process takes place before wrapping the wire. When the wrapped wires are brought together to make the cable a filler such as a petroleum gel is added inside the cable cover to fill the interstitial spaces.

In use the wires are connected to one or more small dc power sources to provide the transmission current that is required and eventually to the telephone terminal equipment, one or more telephone transmitters at one end or location and one or more telephone receivers at the other end. The housings are pressure type closure systems and it is crucial to prevent the entry of invasive water and protect the splices from moisture. The entry of moisture into the cable splices or into a cable which is not surrounded by a closure causes a conductive path through the moisture from wire to wire if the insulation of the wires is not maintained. When this happens, the wires either short out all together or cross-talk is established, thereby disrupting the telephone communications.

The cable splices are protected by housings which enclose the wire splices. The housings are typically maintained under pressure. The housings are laid underground or above ground. The closures are exposed to damaging conditions which can cause leaks in the housings thereby providing an access to water.

One method of providing additional protection to the spliced connections inside the housing includes wrapping the bundle with a flexible material, and injecting a liquid epoxy or urethane into the housing which solidifies within the housing. The composition must be mixed on the site and is typically injected with a gravity flow into the housing. The material typically does not fill the entire interior of the casing and leaves voids. These voids or channels can create an avenue for the entrance of water, particularly at either end of the bundle that exits in the housing and forms the wire bundle in the cable. The wrapping around the splices as in the housing also can cause a funnel effect such that the water enters through a fissure at either end of the closure around the cable and into the wrapping around the bundle.

SUMMARY OF THE INVENTION

The present invention is a gel composition with a tackifier which can be a cable filling, wire coating or otherwise as protective coating to serve as a barrier, and protection from water. The composition can be coated on the wires and used to fill the cable during manufacturing process. The cable is placed in service with a built in protection from water damage.

The composition is composed of a water absorbent polymer with anionic groups attached to a hydrocarbon backbone. This polymer is mixed with a dielectric gel matrix. In many cases, the dielectric gel matrix is hydrophobic and the addition of a hydrophilic substance is necessary as explained below. A tackifier such as a high molecular weight polyisobutylene is added to make the gel sticky so that it adheres to surfaces it contacts.

The composition itself will provide an initial barrier to water. If water does enter, then the water absorbent polymer is activated and the water is absorbed. In tests water was placed adjacent to the gel composition. The fine powder-like material is seen traveling to the water away from the gel matrix. The composition has exhibited this traveling effect for up to six inches from the initial gel matrix boundary. This appears to be the water absorbent polymer seeking out the water. Once the water is contacted it forms a gel-like material similar to a mixture of the polymer and water. The addition of a hydrophilic substance in a gel matrix composed of hydrophobic materials appears to promote this traveling to the water effect.

I have found that the water absorbent polymers with the anionic groups when exposed to small amount of dc current such as that present in a telephone line appears to cause an attraction of the polymer with the anionic groups to the wires which act as an anode. This apparent attraction of the polymer to the exposed wire brings the polymer into electrochemical association with the wire, and insulation develops which excludes water from the surface of the wire. An insulation builds up and the electric path through the wire is established with the short eliminated. The polymer is typically in a granular form. The composition of this invention mixes the polymer with a tackifier and other substances to form a gel which mixture is nonconductive to dc current used in telecommunication. The gel matrix does not inhibit or prevent the insulation of the wire in that the matrix is not conductive to the current carried in the splices.

The composition plays several roles in protecting contents or components in a housing from moisture damage. First, if there is invasive moisture the gel composition will repel water. Upon the presence of moisture the water absorbent component of the gel is activated so that it travels out of the gel matrix to absorb the water. This is particularly useful in use with cables wherein a multitude of wires have very small interstitial spaces. The composition will travel into the small spaces if moisture is present. This causes a plugging effect to further invasive water. The benefit is derived whether or not any electrical current is present.

In the case of, for instance, damaged communication splices where carry a low level dc current the polymer also heals a short. The gel composition will plug the entry of water and heal the short restoring current in the lines.

Depending on the components of the gel the healing process can take as short as several minutes to 2 to 3 hours to insulate the wire so that communication will be established. The water absorbency often starts to occur instantaneously. Typically a fast acting composition is preferred.

DESCRIPTION OF THE PREFERRED EMBODIMENTS

The hydrocarbon polymer has anionic groups on the polymer chain. The anionic groups can be carboxylate, sulfate, phosphate, sulfonate or any other anionic groups which will form a negative charge on exposure to water. The salt form of polymer can be used with a variety of ions including but not limited to alkali metal ions such as lithium, sodium, potassium or alkali earth metals such as magnesium, calcium, strontium, barium, zinc or aluminum. The salt used will depend on the valency of the anionic group attached to the hydrocarbon polymer. The preferred hydrocarbon backbones are superabsorbent polymers of acrylates, acrylamides, methacrylate, methacrylamide, acrylonitrile, methacrylonitrile, tri- and/or tetraethylene glycol, diacrylate, cellulose, cellulose derivatives and polypropenoates.

Typically the wires which serve as the anode are copper. However, wires made of other anodic materials such as aluminum, nickel, cobalt chromium or iron will serve as an anode with the small voltage necessary to carry telephone transmissions.

The polymers of this nature are typically solids. The polymers have been used to sprinkle over splices or cables that needed drying. There is a need for a protective insulating agent in housings to prevent the affects of invasive water. Dry granules would not easily provide contact with the affected splices. The gel matrix provides a dispersant for the polymer to contact the splices.

The hydrocarbon polymer can be dispersed in a number of different types of gel matrix and the gel with the hydrocarbon injected into a housing around the splices. The gel with the dispersed hydrocarbon polymer can be used in a confined area which allows contact to be made with the gel and the wires or splices.

A number of compositions which are gels or can be thickened to form a gel may be used. The gel matrix must be relatively nonconductive to a small dc current. The matrix should provide a fairly uniform dispersal of the anionic hydrocarbon polymer in the gel. The gels that are hydrophobic have a tendency to coat the polymer and essentially shield it from the wire which needs to be protected. A small amount of a hydrophilic substance can be added to a hydrophobic gel. The gel is a carrier for the polymer. The hydrophilic materials provide a conduit between the polymer and the moisture.

The gels used in this composition include silicones, petroleum gels, high viscosity esters, glycols, polyglycols, olefins and fluorocarbons.

In addition, certain corrosive inhibitors which are typically used in greases were found to have no effect on the water absorbency or insulation characteristics of the polymer gel. The rust inhibitors must be chosen with care because an acid may neutralize the effect of the polymer. A neutral barium dinonylnaphthalene sulfonate did not affect the properties of the present invention. It did have a slight tendency to de-gel one of the gel compositions. A copper passivator which is a liquid copper triazole derivative was used without any adverse affects.

The following are examples of different combination of fluid compositions which can be thickened to produce gels which can be used with the water absorbent polymer with anionic groups. The polymer used can be any of the polymers previously described including specifically sodium 2 propenoate and salts of starch-graft copolymer of polyacrylic acid and polyacrylamide. The following examples are not intended to limit the scope of the patent application and are to be illustrative of the number of different compounds which can be used to practice the invention.

EXAMPLE 1

A fluid mixture is prepared using 20 parts by weight polyisobutylene, 4½ parts by weight polyalpha olefin and one part by weight polyalkylene glycol. The polyalkylene glycol which is a random copolymer with 75% ethylene oxide and 25% propylene oxide substitution, with an average molecular weight of from 12,000 to 15,000 and a hydroxyl number between 5 to 10 mgs KOH per gram. The polyisobutylene has a viscosity ASTM D-445 38° C. of 210-227 and the viscosity index ASTM D-567 is 95 with a molecular weight of 750 to about 1200. The polyalpha olefin used was a long chain polyalpha olefin SHF-61 manufactured by Mobil which had a viscosity ASTM D-445 at 38° C. of 30.5, a viscosity index ASTM D-2270 of 132. The polyalpha olefins which can be used, as exemplified by the SHF-61 Mobil product, are typically hydrocarbons with a molecular weight from 200 to 800. The SHF-61 product is an oligomer of 1-decene. The satisfactory viscosity range of the polyalpha olefins is from 2 centistokes at 100° C. to 100 centistokes at 100° C.

Twelve parts of the fluid mixture were mixed with one part of pyrogenic silica thickener to make a gel matrix. The gel matrix has a dielectric constant of less than 3. The resulting gel matrix is blended two parts by weight gel to one part by weight of a water absorbent polymer. To this mixture a high viscosity polyisobutylene was added in the range of about 0.125% to about 1% by weight of the gel matrix. The high viscosity polyisobutylene has a molecular weight range of from about 1200 to 2300 and ASTM D-445 97.8° C. of 3,000-5,000.

A 12 v battery was hooked up to a pair of spliced wires and water was introduced into the spliced area causing a short. A spliced area was then filled with a composition of Example 1 and water began to be absorbed in 60 seconds. The short healed and the cable pair became conductive.

EXAMPLE 2

The same composition of Example 1 can be used substituting the tackifier poly methyl methacrylate (PMM) for high viscosity polyisobutylene. The poly methyl methacrylate can be used as one of the water absorbent polymers. However, when mixed with a diluent such as a petroleum oil it serves as a tackifier. A typical preparation is a PMM with a molecular weight of 2000-5000 mixed in a 6% solution with polyalpha olefin oligomers of 1-decene (such as Rohm and Haas Acriloid). This solution is added to the gel matrix of Example 1 in the range of 0.125%-1% by weight to give a tacky composition.

What is claimed is:

1. A composition for protecting the wires of telecommunications and other cables carrying direct current from shorts caused by moisture comprising:
   a gel matrix which is relatively non-conductive to a small dc current selected from the group consisting of olefins, petroleum gels, and mixtures of olefins and petroleum gels;
   a water absorbent polymer having a hydrocarbon backbone with anionic carboxylate groups attached thereto; and
   a tackifier, said water absorbent polymer being dispersed in said gel matrix whereby the anionic carboxylate groups of said water absorbent polymer cause said water absorbent polymer, when exposed to direct current from a wire in a condition of short caused by the presence of moisture, to be attracted to the wire, the wire acting as an anode to draw the anionic groups of said water absorbent polymer into electrochemical association with the wire, the accumulated water absorbent polymer insulating the wire to exclude moisture from the wire and eliminate the short, restoring current flow through the wire.

2. The composition of claim 1 wherein said tackifier comprises from about 0.125% to about 1% by weight of said gel matrix.

3. The composition of claim 1 wherein said tackifier is selected from the group consisting of a high molecular weight polyisobutylene and a polymethylmethacrylate.

4. The composition of claim 1 wherein the dielectric constant of said gel matrix is less than 3.

5. A composition for filling a cable including wires carrying a small dc current which is used to fill both the interstitial spaces between the wires of the cable and to coat the sheath around the wires for protecting the wires from exposure to moisture comprising:
   a gel matrix which is relatively non-conductive to a small dc current selected from the group consisting of an olefin, a petroleum gel, or a mixture of an olefin and a petroleum gel;
   a water absorbent polymer having a hydrocarbon backbone with carboxylate groups attached thereto dispersed in said gel matrix; and
   sufficient tackifier to cause said gel matrix having said polymer dispersed therein to adhere to a surface contacted with said gel matrix having said polymer dispersed therein.

6. The composition of claim 5 wherein said tackifier is a high molecular weight polyisobutylene.

7. The composition of claim 5 wherein said tackifier comprises 0.125% to 1% by weight of said gel matrix.

8. The composition of claim 5 wherein the dielectric constant of said gel matrix if 3.

* * * * *